(12) United States Patent
Oliveira et al.

(10) Patent No.: US 7,935,206 B2
(45) Date of Patent: May 3, 2011

(54) HYBRID PRESSURE VESSEL WITH SEPARABLE JACKET

(75) Inventors: Tiago Oliveira, Oporto (PT); Joao Carlos V. Antunes Guimaraes, Braga (PT); Eduardo J. Alves, Oporto (PT)

(73) Assignee: AMTROL Licensing Inc., West Warwick, RI (US)

( * ) Notice: Subject to any disclaimer, the term of this patent is extended or adjusted under 35 U.S.C. 154(b) by 0 days.

(21) Appl. No.: 12/761,955

(22) Filed: Apr. 16, 2010

(65) Prior Publication Data

US 2010/0236051 A1 Sep. 23, 2010

Related U.S. Application Data

(62) Division of application No. 11/540,189, filed on Sep. 29, 2006, now Pat. No. 7,699,188.

(51) Int. Cl.
  *F17C 1/02* (2006.01)
  *B32B 3/10* (2006.01)
(52) U.S. Cl. .................. 156/169; 156/187; 156/191
(58) Field of Classification Search ........... None
  See application file for complete search history.

(56) References Cited

U.S. PATENT DOCUMENTS

| | | | |
|---|---|---|---|
| 1,517,978 A | 12/1924 | Giese | |
| 3,788,511 A * | 1/1974 | Marsh | 220/23.91 |
| 3,843,010 A | 10/1974 | Morse et al. | |
| 4,225,051 A | 9/1980 | Faudou et al. | |
| 4,360,116 A | 11/1982 | Humphrey | |
| 4,653,663 A | 3/1987 | Holtsclaw | |
| 4,905,856 A | 3/1990 | Krogager | |
| 4,925,044 A | 5/1990 | Hembert | |
| 5,025,943 A | 6/1991 | Forsman | |
| 5,253,778 A | 10/1993 | Sirosh | |
| 5,287,988 A | 2/1994 | Murray | |
| 5,385,262 A | 1/1995 | Coquet et al. | |
| 5,476,189 A | 12/1995 | Duvall et al. | |
| 5,494,188 A | 2/1996 | Sirosh | |
| 5,518,141 A | 5/1996 | Newhouse et al. | |
| 5,673,794 A | 10/1997 | Kuipers et al. | |
| 5,758,796 A | 6/1998 | Nishimura et al. | |
| 6,012,411 A | 1/2000 | Hochbrueckner | |
| 6,015,065 A | 1/2000 | McAlister | |
| 6,022,435 A | 2/2000 | Palazzo | |

(Continued)

FOREIGN PATENT DOCUMENTS

EM 0002887410001 8/2005

(Continued)

OTHER PUBLICATIONS

Health & Safety Executive Specification for Welded Steel Non Refillable Transportable Pressure Receptacles Dot 39 (HSE) Issue 1 Jan. 2000.

(Continued)

*Primary Examiner* — Sam C Yao (74) *Attorney, Agent, or Firm* — Edwards Angell Palmer & Dodge LLP (57) ABSTRACT

A pressure vessel is provided including an inner tank formed from a tank liner surrounded by a wound layer of composite filaments. A protective jacket is disposed on the inner tank that facilitates stacking and portability of the pressure vessel and helps to define an air passage for convective heat transfer between the hybrid tank and the environment.

6 Claims, 7 Drawing Sheets

U.S. PATENT DOCUMENTS

| | | |
|---|---|---|
| 6,135,308 A | 10/2000 | Fang |
| 6,189,723 B1 | 2/2001 | Davis et al. |
| 6,386,384 B1 | 5/2002 | Chohfi et al. |
| 6,401,963 B1 | 6/2002 | Seal et al. |
| 6,460,721 B2 | 10/2002 | Bowen et al. |
| 6,651,307 B2 | 11/2003 | Portmann |
| 2003/0111473 A1 | 6/2003 | Carter et al. |
| 2005/0001394 A1 | 1/2005 | Gibby |

FOREIGN PATENT DOCUMENTS

| | | |
|---|---|---|
| EP | 0146081 A2 | 6/1985 |
| EP | 0666450 A1 | 8/1995 |
| JP | 2000046296 A | 2/2000 |
| JP | 2000213691 A | 8/2000 |
| WO | WO-9717570 A1 | 5/1997 |
| WO | WO-0066939 A1 | 11/2000 |
| WO | WO-0157429 A1 | 8/2001 |
| WO | WO-03029718 A1 | 4/2003 |

OTHER PUBLICATIONS

International Search Report dated Aug. 3, 2006 for PCT/US05/14151.

International Search Report and The Written Opinion of the International Searching Authority for PCT/US07/21056, dated Mar. 3, 2008.

International Preliminary Report on Patentability for PCT/US07/21056, dated Apr. 9, 2009.

* cited by examiner

HYBRID PRESSURE VESSEL WITH SEPARABLE JACKET

CROSS-REFERENCE TO RELATED APPLICATIONS

This application is a divisional of U.S. patent application Ser. No. 11/540,189, filed Sep. 29, 2006 now U.S. Pat. No. 7,699,188 which claims the benefit of priority from U.S. patent application Ser. No. 29/259,834, filed May 16, 2006, now U.S. Pat. No. D566,807 granted Apr. 15, 2008, and U.S. patent application Ser. No. 11/115,992, filed Apr. 25, 2005, now U.S. Pat. No. 7,255,245 granted Aug. 14, 2007, which claims priority from U.S. Provisional Patent Application Ser. No. 60/564,776, filed Apr. 23, 2004, the disclosures of which are incorporated by reference herein in their entireties.

BACKGROUND OF THE INVENTION

1. Field of the Invention

The subject invention is directed to pressure vessels, and more particularly to a pressure vessel having a hybrid tank formed of a tank liner and outer composite layer with a protective jacket disposed thereon.

2. Background of the Related Art

Pressure vessels come in all sizes and shapes, and are made from a variety of materials. The need for lightweight pressure vessels has existed and still exists. There have been many attempts to make light weight pressure vessels that are able to store fluids under high pressures for long periods of time, maintain structural integrity, sustain repeated pressurization and depressurization, and be substantially impermeable, resistant to corrosion, and easy to manufacture.

Increased use of alternative fuels, such as compressed natural gas and hydrogen to fuel vehicles, and the need for ever greater fuel range has increased the need for lightweight, safe tanks with greater capacity and strength. Increasing the capacity and strength of a pressure vessel can be achieved by increasing the amount of materials used for structural support. However, this can result in a significant increase in the size and/or weight of the pressure vessel, which can increase the cost of the tank arising from increased material costs and costs associated with transporting the heavier pressure vessels.

Clearly, there is a need in the art for a lightweight pressure vessel that is impermeable, corrosion resistant and that can handle increased capacity and pressure demands. Furthermore, there is a need for a method of forming such a pressure vessel so it may be sold at a competitive price.

SUMMARY OF THE INVENTION

The subject invention provides a pressure vessel which satisfies the aforementioned needs in the art. In particular, the present invention provides a pressure vessel that includes a hybrid tank formed by a tank liner and an outer reinforcing layer disposed on the tank liner, with the outer reinforcing layer defining at least a portion of an outer surface of the hybrid tank. A protective jacket configured and dimensioned to engage the hybrid tank is disposed thereon. The protective jacket includes an upper support rim having a first opening therethrough, a lower support rim having a second opening therethrough, and a substantially cylindrical wall connecting the upper support rim and lower support rim. The wall defines an inner surface disposed radially outwardly from the outer surface of the hybrid tank, and the inner surface of the wall and the outer surface of the hybrid tank cooperate to define a flow channel in fluid communication with the first opening and the second opening, wherein the openings and flow channel are adapted to permit a convective flow to pass therethrough to facilitate heat transfer between the hybrid tank and an environment in which the pressure vessel is situated. The protective jacket is preferably separable into at least two sections.

In accordance with a further embodiment of the invention, the tank liner may include a material having a higher modulus of elasticity and a lower elastic strain limit than the outer reinforcing layer. If desired, the outer reinforcing layer can be fabricated of a thermoplastic material, preferably polypropylene, commingled with glass fibers. Preferably the hybrid tank includes an outer anti-corrosion coating. If desired, the outer reinforcing layer can include an outer gel coating.

In accordance with another embodiment of the invention, the upper support rim includes at least one handle and the lower support rim includes a base configured and adapted to form a non-permanent mating engagement with the at least one handle of another pressure vessel when stacking multiple pressure vessels.

The present invention also provides a method of manufacturing a pressure vessel. The method includes forming a tank liner, heating glass filaments, commingling the filaments with a thermoplastic material and winding the thermoplastic material and commingled filaments onto the tank liner under application of heat to form a hybrid tank having an outer surface.

In further accordance with the invention, the method further can include the step of attaching a protective jacket to the hybrid tank, where the protective jacket includes an upper support rim having a first opening therethrough, a lower support rim having a second opening therethrough, and a substantially cylindrical wall connecting the upper support rim to the lower support rim. The wall defines an inner surface disposed radially outwardly from the outer surface of the hybrid tank, and the inner surface of the wall and the outer surface of the hybrid tank cooperate to define a flow channel in fluid communication with the first opening and the second opening, wherein the openings and flow channel are adapted to permit a convective flow to pass therethrough to facilitate heat transfer between the hybrid tank and an environment in which the pressure vessel is situated.

These and other aspects of the pressure vessel of the subject invention will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to make and use the pressure vessel of the present invention, embodiments thereof will be described in detail hereinbelow with reference to the drawings, wherein.

DETAILED DESCRIPTION OF PREFERRED EMBODIMENTS

Reference will now be made in detail to the present preferred embodiments of the invention, examples of which are illustrated in the accompanying drawings. The method and corresponding steps of the invention will also be described in conjunction with the detailed description of the system.

The pressure vessels presented herein, and the products of the methods presented herein, may be used for storing pressurized fluids. The present invention is particularly suited for storing and dispensing pressurized fluids while facilitating stacking and portability of the pressure vessel. A pressure vessel constructed in accordance with the present invention is suitable for applications including, but not limited to, storing propane, refrigerant gas, and liquids or gases at low or high pressure.

In accordance with the invention, a pressure vessel is provided including a hybrid tank having an inner liner and an outer reinforcing layer, and a protective jacket adapted to surround the hybrid tank. The protective jacket includes an upper support rim having an opening therethrough and a lower support rim having a second opening therethrough. The protective jacket also includes a substantially cylindrical wall spaced apart from the hybrid tank to allow a convective flow between the protective jacket and the hybrid tank for convective heat transfer between the pressure vessel and the environment to reduce pressure loss during consumption of the pressurized contents.

Figure 1:
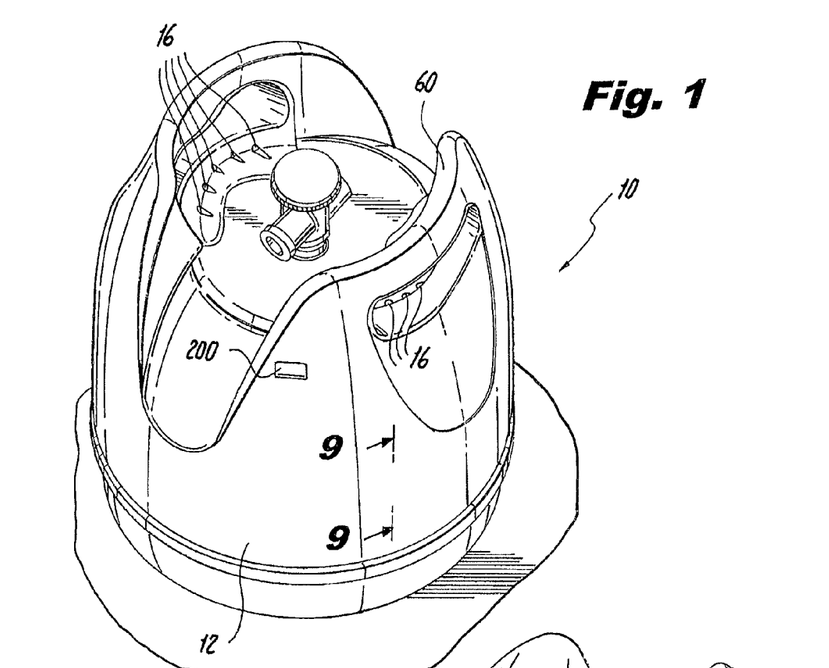
FIG. 1 is a perspective view of a pressure vessel constructed in accordance with a preferred embodiment of the subject invention as seen from above, showing openings in the upper support rim of the protective jacket, as well as a valve fitting assembly, and handles on the upper support rim.

For purpose of explanation and illustration, and not limitation, a view of an exemplary embodiment of a pressure vessel made in accordance with the present invention is depicted in FIG. 1 and is designated generally by reference number 10. Other aspects of the pressure vessel depicted in FIG. 1 are depicted in FIGS. 2-12, as will be described.

For purposes of illustration and not limitation, as embodied herein and as depicted in FIGS. 1-12, a pressure vessel 10 is provided with a hybrid tank 14. Hybrid tank 14 has a tank liner 38 that may be formed from a generally cylindrical tube 20 and first and second dome-shaped, semi-hemispherical endcaps 22 and 24. Endcaps 22 and 24 may be of any size or shape, such as frustro-conical or flattened, and may be identical or different. First and second endcaps 22 and 24 are secured to first and second end rims 26 and 28 of tube 20, respectively, which may be accomplished by any conventional welding techniques known in the art, such as laser welding. Tube 20 and first and second endcaps 22 and 24 cooperate to define vessel storage cavity 30, as particularly depicted in FIGS. 6 and 9.

As depicted, first endcap 22 includes a central aperture 32 defined therein for receiving a valve boss 34, which is secured to aperture 32 by any conventional welding or other suitable joining techniques as are known in the art. Valve boss 34 is configured to receive a valve fitting assembly 36 therein, and the combination permits the ingress or egress of fluids to vessel storage cavity 30.

If desired, the tank liner 38 may be constructed without the tube 20. In accordance with this alternative embodiment, endcaps 22 and 24 are joined directly to each other rather than to the tube 20. As such, endcaps 22, 24 may take on a variety of shapes, and need not be generally hemispherical, but can be more "cup" shaped, as desired, as will be appreciated by those of skill in the art.

Preferably, tank liner 38 including tube 20, first and second endcaps 22 and 24, and valve boss 34 are constructed of an inert, impermeable and non-corrosive material having a high modulus of elasticity, such as 10 million psi or greater, and a low elastic strain generally ranging from about 0.05% to about 1%. As such, the tank liner 38 and valve fitting assembly 36 may be made from steel, but may also be fabricated of metals such as, but not limited to, aluminum, nickel, titanium, platinum, or any other material which would provide suitable structural support in accordance with the present invention. It is also within the scope and spirit of the invention to fabricate the tank liner 38 from polymeric materials.

In further accordance with the invention, a hybrid tank is further provided including an outer reinforcing layer.

Figures 5, 6:
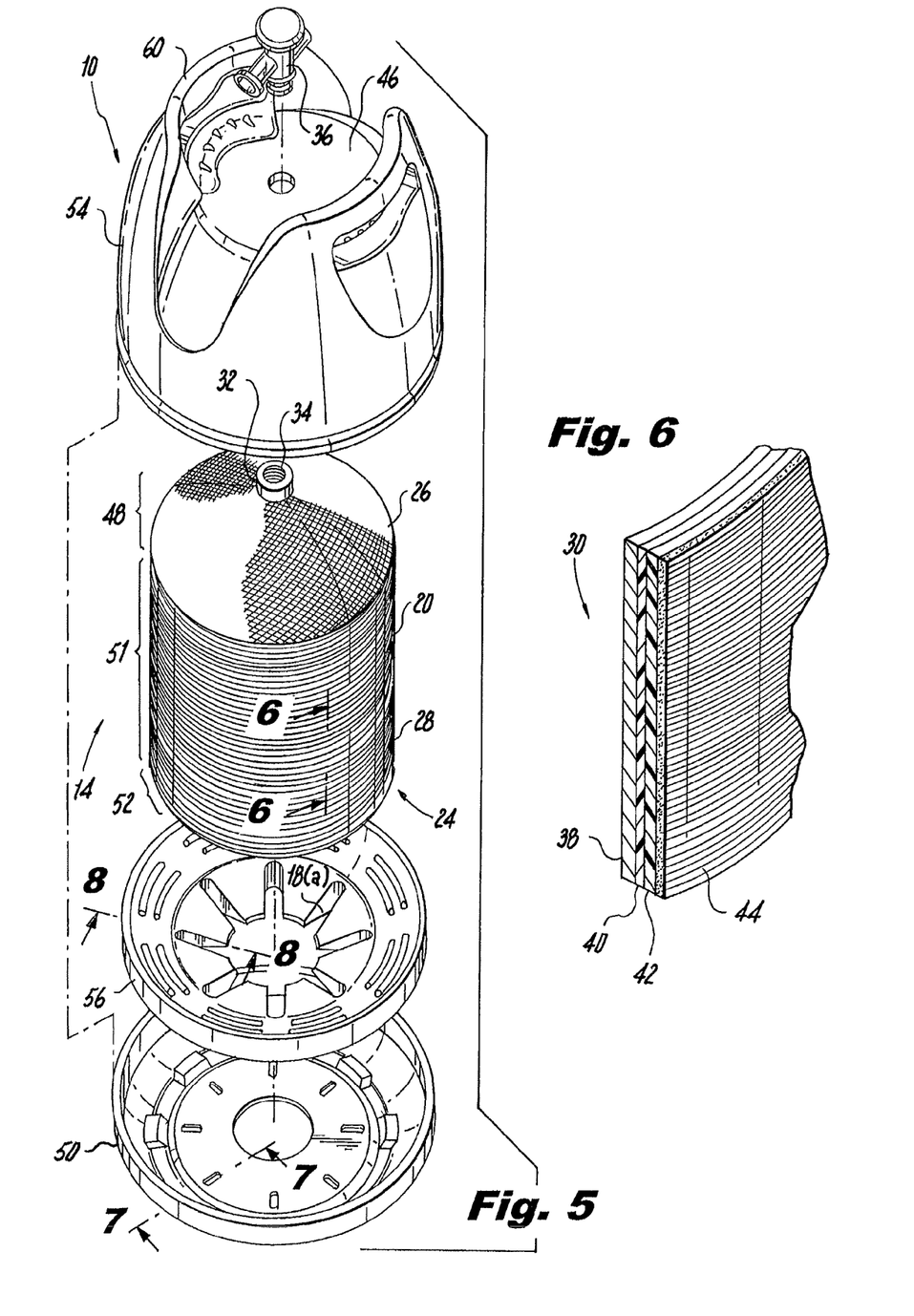
FIG. 5 is an exploded perspective view of the pressure vessel shown in FIG. 1.
FIG. 6 is a partial cross-section view of the hybrid tank of the pressure vessel shown in FIG. 5, depicting layers of material of the hybrid tank.

For purposes of illustration and not limitation, as embodied herein and as depicted in FIG. 6, a cross section of a wall section of hybrid tank 14 is depicted. As shown in FIG. 6, an outer reinforcing layer 42 is disposed about the tank liner 38. Reinforcing layer 42 is fabricated of one or more layers of a material having a higher elastic strain limit than that of the material used for the tank liner 38, as described in further detail below. Preferably, an anti-corrosive coating 40 is applied to the outside of the tank liner 38 before disposing the reinforcing layer 42 on the tank liner. This can be particularly advantageous where the tank liner 38 is fabricated from metal. As such, the anti-corrosive coating 40 helps prevent corrosion between the tank liner 38 and the reinforcing layer 42, which could otherwise weaken the hybrid tank 14. The anticorrosive coating can be composed of a variety of materials, including zinc rich primers and other anti-corrosive coatings as are known in the art. The anti-corrosive coating can be applied, for example, by spraying a powder coating on the tank liner 38, followed by heating to set the power coat. Other methods of applying the anti-corrosive coating are also possible and within the scope of the invention. Preferably, the anti-corrosive coating 40 is applied to the entire outward surface of the tank liner 38.

Reinforcing layer 42 may include a composite material having a skeleton that imparts desirable mechanical properties to the composite, such as a high tensile strength, and a matrix of material having high ductility that can bind the composite to render it stiff and rigid, among other things.

Reinforcing layer 42 reinforces and provides impact resistance to hybrid tank 14. The outer surface of reinforcing layer 42 preferably includes a protective layer 44 comprised of a gel coating, for example or other finishing coatings to protect the reinforcing layer 42. Suitable materials for forming protective layer 44 include, for example, thermoplastic modified polyolefin powder, applied, for example, by spraying techniques and consequent heating to set, and the like.

Preferably, the composite material in reinforcing layer 42 consists of fibers or filaments that are commingled or impregnated with a thermoplastic resin. The impregnated filaments may include, but are not limited to, combinations of glass, metal, aramid, carbon, graphite, boron, synthetics, resins, epoxies, polyamides, polyoelfins, silicones, and polyurethanes, among other things. Preferably, the filaments are a composite of thermoplastic resin, such as vinyl epoxy or polypropylene, and glass fiber. The filaments can be formed from a commingled thermoplastic and glass fiber fabric sold as TWINTEX, commercially available from Saint-Gobain Vetrotex America Inc. Preferably, the composite material used in reinforcing layer 42 is a recyclable material.

Figure 2:
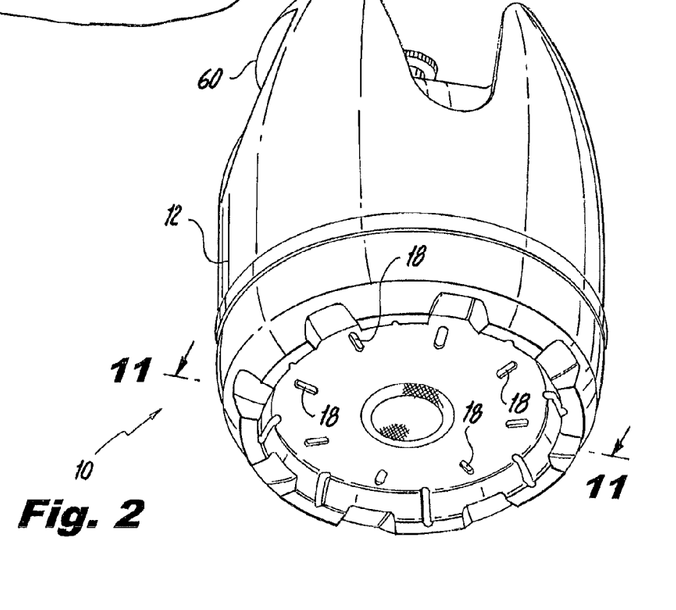
FIG. 2 is a perspective view of the pressure vessel shown in FIG. 1, as seen from below, showing the lower support rim of the protective jacket, as well as openings therethrough.
Figure 3:
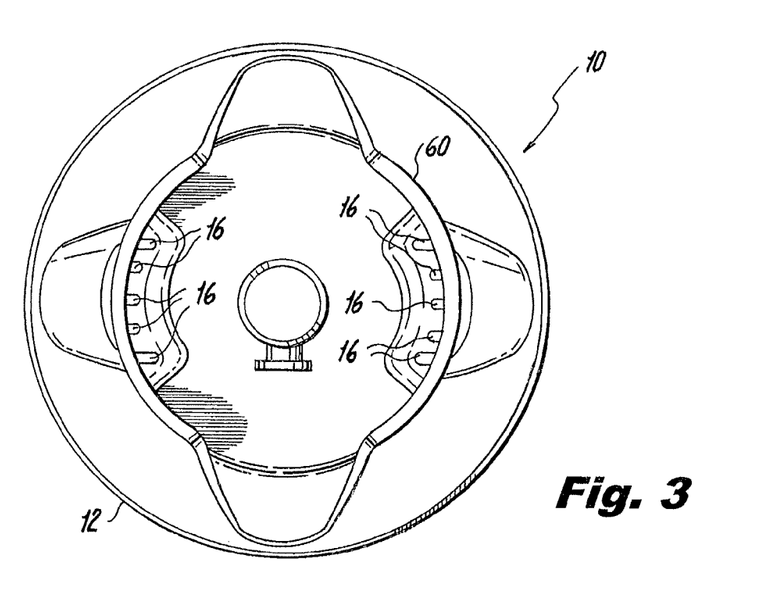
FIG. 3 is a top view of the pressure vessel shown in FIG. 1, depicting openings in the upper support rim to facilitate airflow through the protective jacket and further depicting handles on the upper support rim adapted and configured to allow access to the valve fitting assembly.
Figure 4:
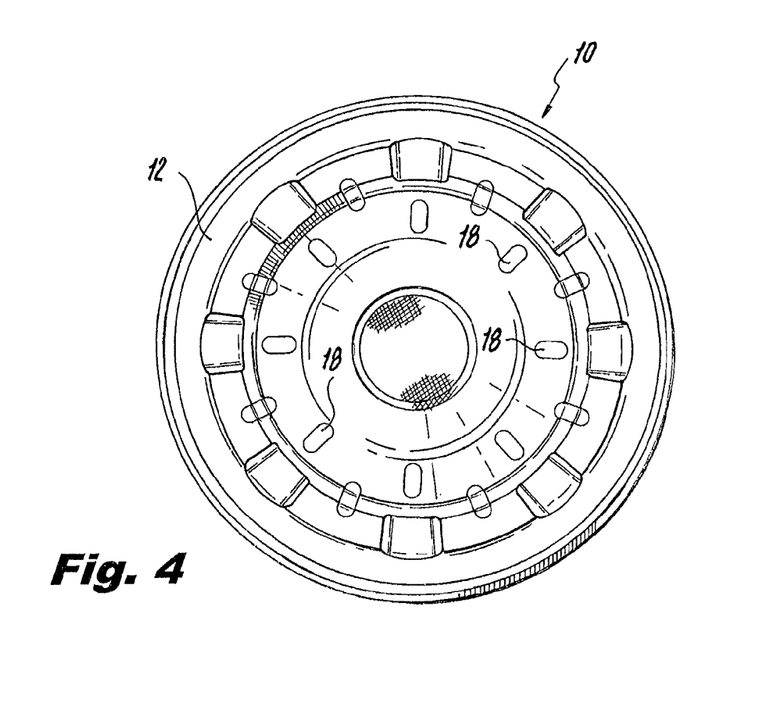
FIG. 4 is a bottom view of the pressure vessel shown in FIG. 1, showing openings in the lower support rim for airflow into and out of the protective jacket.

In further accordance with the invention, the pressure vessel includes a protective jacket. For purposes of illustration, and not limitation, as depicted in FIGS. 1-5, protective jacket 12 surrounds the hybrid tank 14. Protective jacket 12 has an upper support rim 46, and a lower support rim 50, and a substantially cylindrical wall 54 between the upper support rim 46 and lower support rim 50. Upper support rim 46 is disposed substantially about the periphery of an upper portion 48 of the hybrid tank 14 and a lower support rim 50 is disposed substantially about the periphery of a lower portion 52 of the hybrid tank 14. FIGS. 1 and 3 depict upper airflow openings 16 in the upper support rim 46. FIGS. 2 and 4 depict lower airflow openings 18 in the lower support rim 50. Upper airflow openings 16 and lower airflow openings 18 allow air to flow to and from outside to facilitate heat transfer between the environment and the pressurized contents of the hybrid tank 14, discussed in detail below. Upper and lower support rims 46 and 50 are preferably configured to engage the hybrid tank 14 to restrict movement of the hybrid tank 14 within the confines of protective jacket 12. Movement is further restricted by the shock absorbing padding 56 in the lower support rim 50 disposed between protective jacket 12 and hybrid tank 14. Padding 56 can be made from a variety of materials, including expanded polypropylene, among others.

Protective jacket 12 is preferably constructed of a rigid, lightweight material, such as a hard plastic, such as polypropylene or high density polyethylene, or other suitable materials. In this configuration, the protective jacket 12 can protect the hybrid tank 14 from impacts, abrasions, and exposure to corrosive materials, among other things.

It is known in the art that the consumption of gas from a pressurized vessel causes cooling of the pressurized vessel. This cooling can reach an extent to which the liquefied gas can no longer evaporate at an adequate rate. In this situation, there will be a pressure loss that hinders evacuation from the pressurized vessel. The transfer of heat from the ambient environment in which the pressure vessel is situated to the contents of the pressure vessel therefore should be facilitated to maintain the pressure of the contents of the pressure vessel during gas consumption. However, adding protective jackets to pressure vessels generally results in adding material between the pressurized contents and the environment. As such, protective jackets tend to insulate pressurized contents, hinder heat exchange, and ultimately promote the undesirable pressure loss during gas consumption. It is therefore desirable to minimize the insulative effects of protective jackets.

It is known it the art to provide a jacket for an all-metal pressure tank in which wave-like undulations formed in the wall of a jacket provide channels for convective air flows, such as in U.S. Pat. No. 6,386,384, which is incorporated herein by reference in its entirety. These wave-like channels function well in providing for heat transfer in the case of all-metal tanks as found in the art, but a fiber-composite/metal embodiment of hybrid tank 14 creates a need for further advances to enhance the convective flow, since the composite reinforcing layer 42 provides more thermal insulation than is present in the all-metal tanks of the prior art.

Therefore, the configuration of protective jacket 12 permits for enhanced flow that may substantially surround the circumference of the hybrid tank 14. This is an advance over the art because heat exchange takes place along a greater surface area than allowed for in the wave-like channels known in the art. This enhancement to the flow and surface area of the convective heat exchange helps compensate for the increased thermal insulation of the hybrid tank 14 as contrasted with the all-metal tanks of the prior art.

Figure 9:
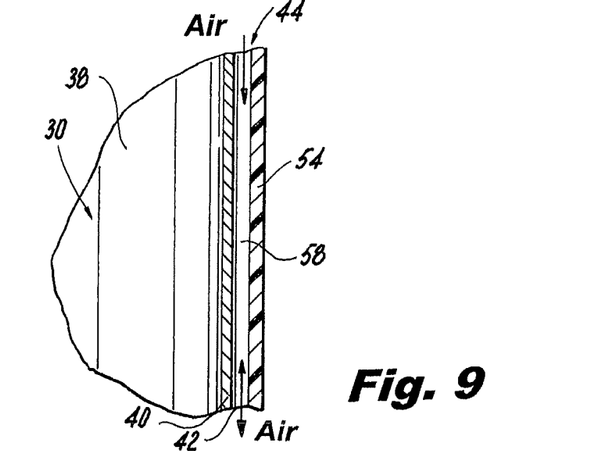
FIG. 9 is a partial cross-section view of an protective jacket and hybrid tank of the assembled pressure vessel shown in FIG. 1, showing the channel for flow of air between the hybrid tank and the protective jacket.

To this end, the present invention facilitates downward natural convective flows between the protective jacket 12 and the hybrid tank 14 to gain the advantages of the protective jacket while minimizing the loss of pressure due to inadequate heat exchange. The substantially cylindrical wall 54 of protective jacket 12 is disposed around a middle portion 51 of hybrid tank 14. As shown in FIG. 9, the inner surface of the substantially cylindrical wall 54 is spaced apart from the outer surface of the hybrid tank 14 to allow a generally downward vertical flow of air to develop between the hybrid tank 14 and the protective jacket 12. There is thus a generally annular flow channel 58 defined between the hybrid tank 14 and the protective jacket 12 in fluid communication with the environment in which the pressure vessel 10 is located.

Figure 7:
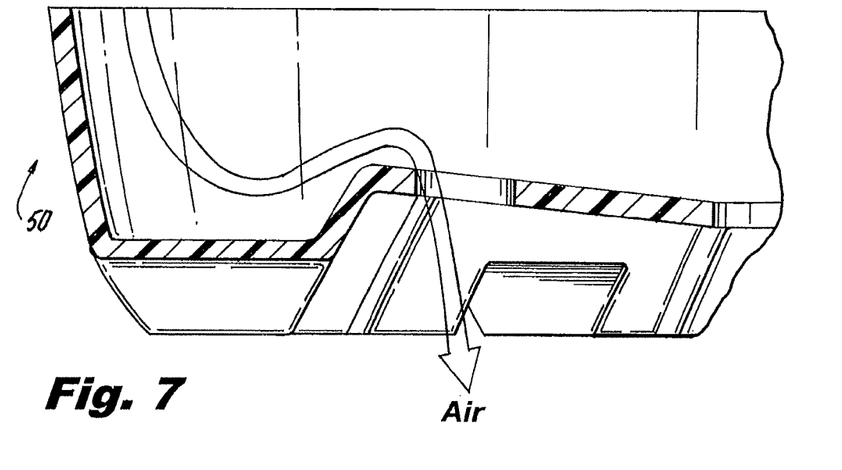
FIG. 7 is a partial cross-section view of the lower support rim of the protective jacket of the pressure vessel shown in FIG. 5.
Figure 8:
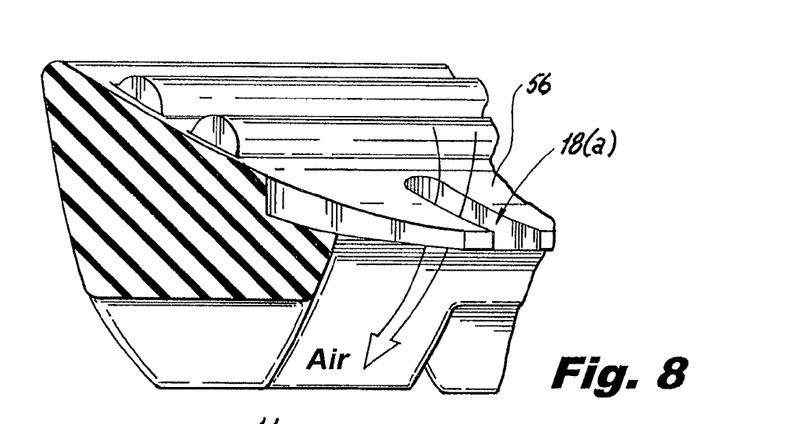
FIG. 8 is a partial cross-section view of the padding and lower support rim of the pressure vessel shown in FIG. 5.
Figure 10:
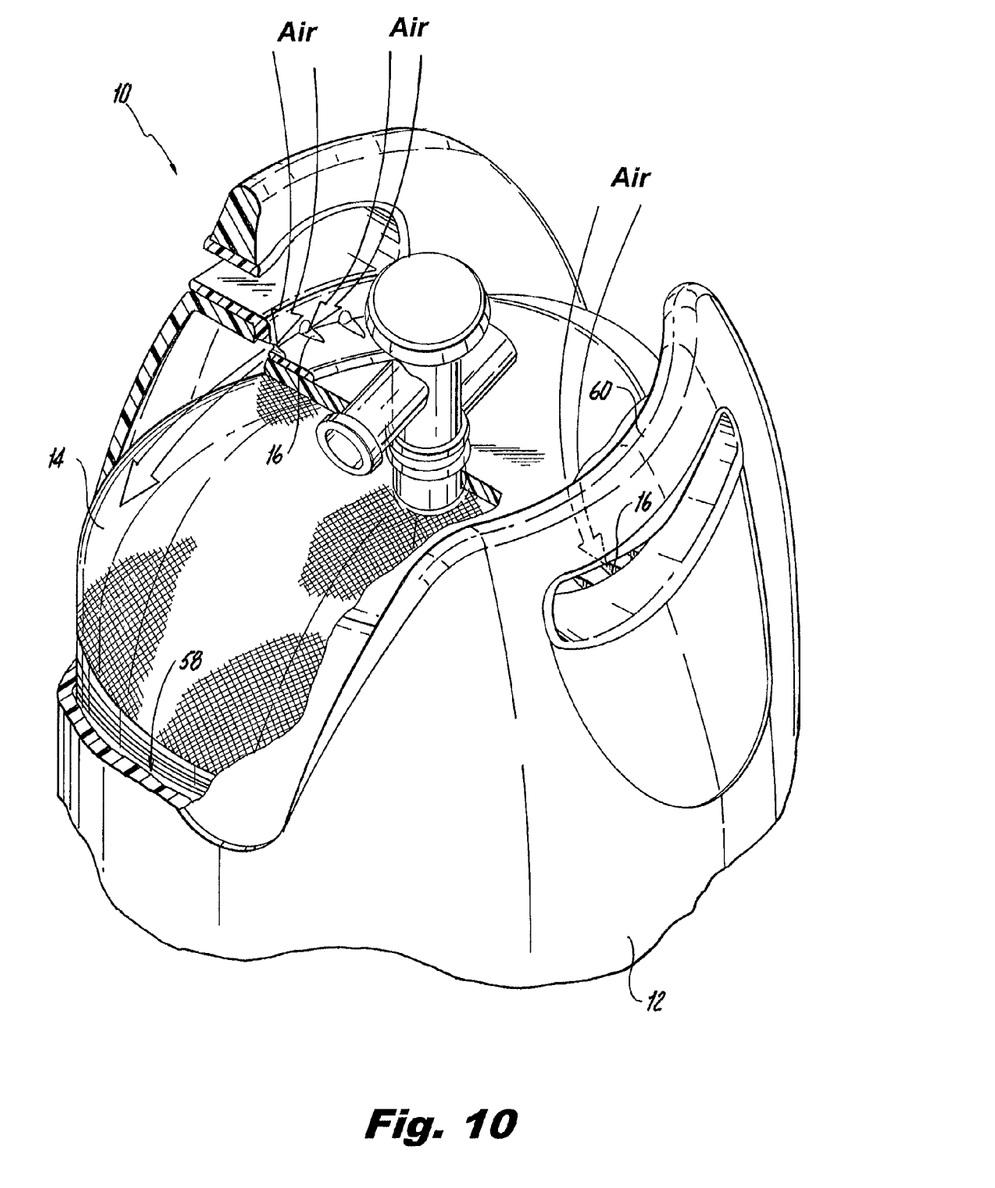
FIG. 10 is a partial cut away perspective view of the pressure vessel shown in FIG. 1, showing how the flow of air can pass trough the openings in the upper support rim and into the space between the hybrid tank and the protective jacket.
Figure 11:
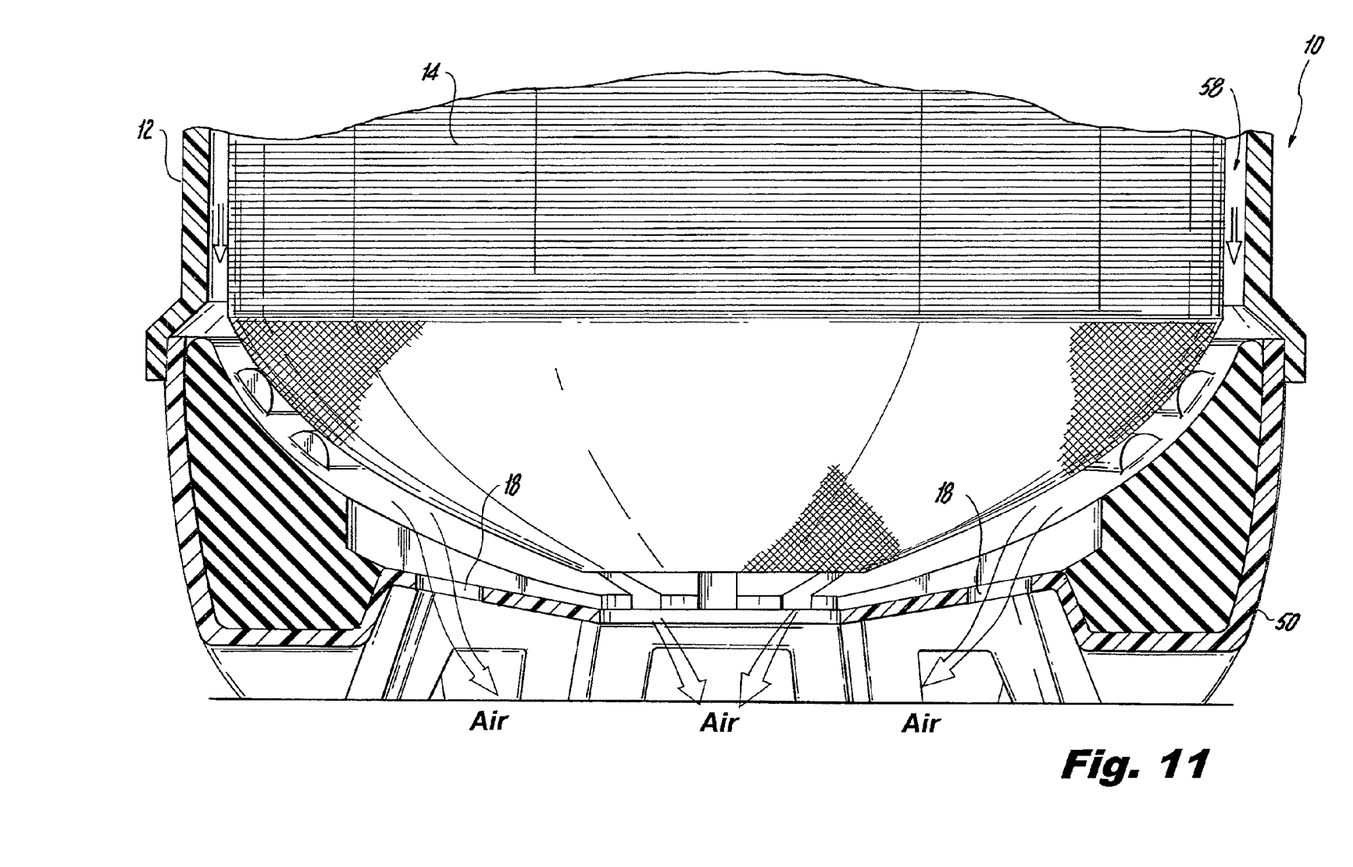
FIG. 11 is a partial cross-section view of the assembled pressure vessel shown in FIG. 2, showing how the flow of air can pass trough the openings in the lower support rim, past the padding, and into the space between the hybrid tank and the protective jacket.

FIG. 10 shows how air can communicate from outside the pressure vessel 10, through the upper openings 16, down into the annular flow channel 58 and out through lower openings 18. In particular, FIGS. 7, 8, and 11 show how air can communicate from the substantially annular flow channel 58 inside the pressure vessel 10, past openings 18(*a*) in the padding 56 (FIG. 5), through the lower openings 18, and into the environment. The ability of air to flow from upper openings 16, through the annular flow channel 58, and out the lower openings 18 permits natural convection flows to develop along the whole circumference of the annular flow channel 58, and thus gives the pressure vessel an enhanced ability to exchange heat between the hybrid tank 14 and the environment, while also having the added durability afforded by the protective jacket 12.

In another aspect of a preferred embodiment of the invention, the upper support rim 46 includes at least one handle 60 configured to permit access to valve fitting assembly 36, as shown in FIGS. 1-3. Preferably, handle 60 is ergonomically designed to assist transport of pressure vessel 10.

Figure 12:
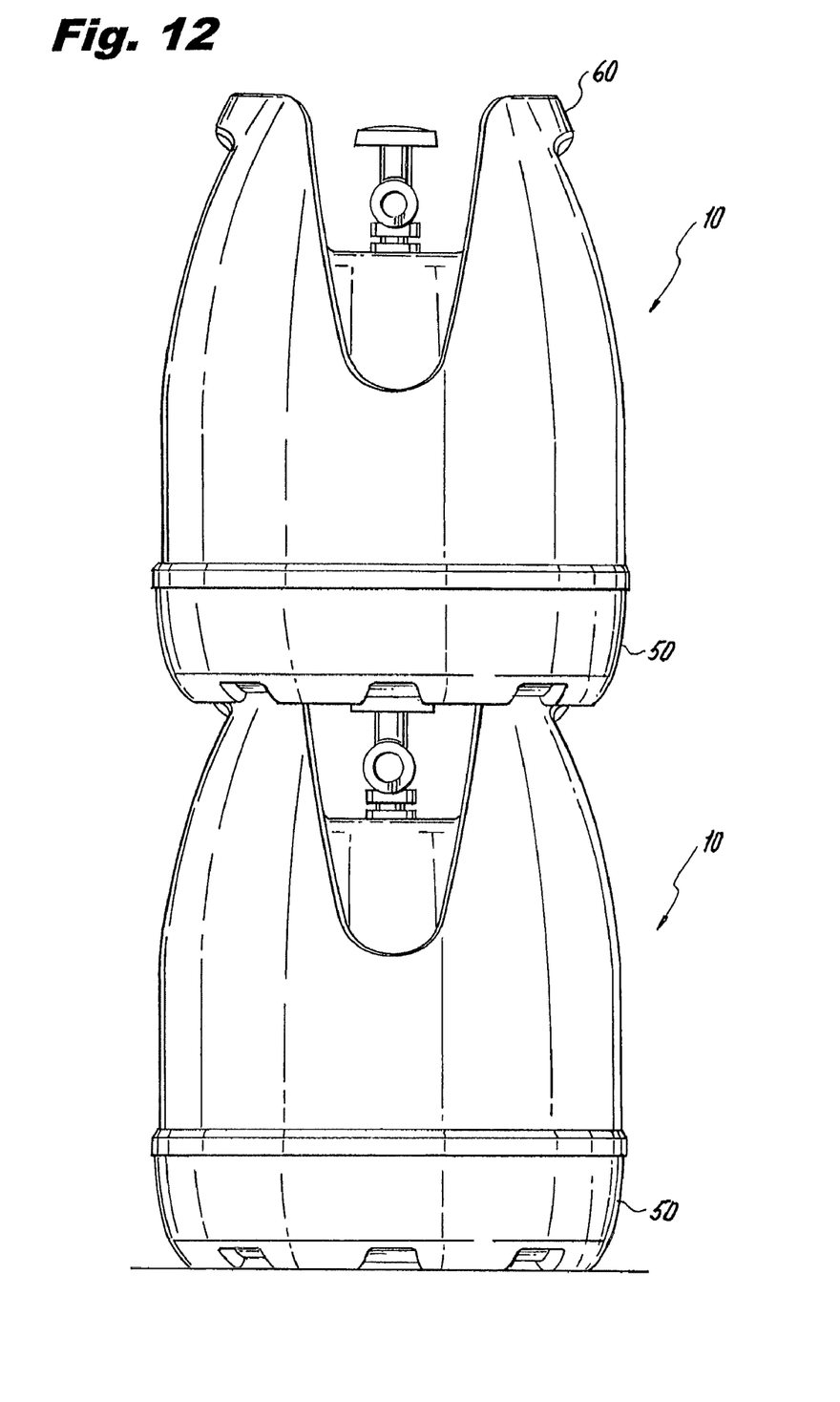
FIG. 12 is a side view showing two pressure vessels as depicted in FIG. 1 in a nested configuration.

By way of further example, for purposes of illustration only, as shown in FIG. 12, handle 60 and lower support rim 50 are preferably configured to engage one another to facilitate transporting and stacking a plurality of pressure vessels 10. In this embodiment, handles 60 are curved and configured to form a non-permanent mating engagement with lower support rim 50, which is configured to receive the handles 60, when stacking multiple pressure vessels 10.

In accordance with another embodiment of the invention, a pressure vessel can be provided further including a means for uniquely identifying each tank. For purposes of illustration only, and not limitation, an identification means, such as a radio frequency identification tag, microchip and/or barcode 200 (FIG. 1) can be provided to uniquely identify each pressure vessel. During manufacture, a database can be maintained for uniquely identifying and tracking each cylinder after the cylinder leaves the manufacturing facility. A variety of variables can be tracked for each cylinder by the manufacturer, such as the tare weight, retest date, manufacturing date, batch or lot numbers, and the like.

In accordance with another aspect of the invention, a method for manufacturing a pressure vessel is provided. For purposes of illustration only, and not limitation, the method preferably includes forming a tank liner (such as tank liner 38), heating glass filaments, commingling the filaments with a thermoplastic material, winding the thermoplastic material and commingled filaments onto the tank liner 38 under application of heat to form a hybrid tank 14, and attaching a protective jacket 12 to the hybrid tank 14 to create the substantially annular flow channel 58 as described herein.

By way of further example, the method can further include a step of applying an anti-corrosion coating to the outside of the tank liner 38 before winding the thermoplastic material and commingled filaments onto the tank liner 38. This anti-corrosion coating 40 can reduce corrosion between the tank liner 38 and outer reinforcing layer 42 in the case of a metal tank liner 38.

The winding step can include rotating the tank liner on a mandrel while the filaments are wound onto the tank liner, as is known in the art. The winding may be done continuously with a single filament comprising the outer reinforcing layer 42 of hybrid tank 14. In further accordance with the method of the invention, it is also possible to commingle the filaments with polypropylene as the thermoplastic material. The method may further include applying a final outer gel coating 44 over the outer reinforcing layer 42, as is known in the art.

In further accordance with the method of the invention, it is possible for the protective jacket 12 to be attached to the hybrid tank 14 by having the protective jacket be separable into at least two sections that attach together with clipping systems as is known in the art. The sections can be separable along a circumference of the generally cylindrical wall 54 of protective jacket 54, as shown in FIG. 5. Or the sections could be separable longitudinally or obliquely without departing from the spirit and scope of the invention. The sections of the jacket may be attached to one another by permanent or non-permanent engagement, as desired. For example, the sections of jacket 12 may be permanently attached to each other by welding, adhesive or fasteners. If desired, the connection between sections of jacket 12 may be non-permanent, such as by a snap fit connection.

The methods and systems of the present invention, as described above and shown in the drawings, provide for a pressure vessel with superior properties including ease of manufacture, light weight, ergonomics, stackability, resistance to corrosion and impact, and enhanced heat transfer. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A method of manufacturing a pressure vessel comprising:
   a) forming a tank liner;
   b) heating glass filaments;
   c) commingling the filaments with a thermoplastic material;
   d) winding the thermoplastic material and commingled filaments onto the tank liner under application of heat to form a hybrid tank having an outer surface; and
   e) attaching a protective jacket to the hybrid tank, the protective jacket including:
   i) an upper support rim having a first opening therethrough;
   ii) a lower support rim having a second opening therethrough; and
   iii) a substantially cylindrical wall connecting the upper support rim to the lower support rim, the wall defining an inner surface disposed radially outwardly from the outer surface of the hybrid tank, the inner surface of the wall and the outer surface of the hybrid tank cooperating to define a substantially annular flow channel from the upper support rim to the lower support rim in fluid communication with the first opening and the second opening, wherein the openings and flow channel are adapted to permit a convective flow to pass therethrough along a whole circumference of the outer surface of the hybrid tank to facilitate heat transfer between the hybrid tank and an environment in which the pressure vessel is situated.

2. A method of manufacturing a pressure vessel according to claim 1, wherein the tank liner is rotated on a mandrel when the filaments are wound onto the tank liner.

3. A method of manufacturing a pressure vessel according to claim 1, wherein the winding is continuous.

4. A method of manufacturing a pressure vessel according to claim 1, wherein the thermoplastic material includes polypropylene.

5. A method of manufacturing a pressure vessel according to claim 1, further comprising applying an outer anti-corrosion coating to the tank liner after forming the tank liner.

6. A method of manufacturing a pressure vessel according to claim 1, further comprising applying an outer gel coating over the hybrid tank.

* * * * *